US012157100B1

(12) United States Patent
Wrubel

(10) Patent No.: US 12,157,100 B1
(45) Date of Patent: *Dec. 3, 2024

(54) SHAKING ADAPTER FOR A POWER TOOL

(71) Applicant: Joseph J. Wrubel, Millstadt, IL (US)

(72) Inventor: Joseph J. Wrubel, Millstadt, IL (US)

( * ) Notice: Subject to any disclaimer, the term of this patent is extended or adjusted under 35 U.S.C. 154(b) by 851 days.

This patent is subject to a terminal disclaimer.

(21) Appl. No.: 17/318,230

(22) Filed: May 12, 2021

Related U.S. Application Data

(63) Continuation-in-part of application No. 16/991,895, filed on Aug. 12, 2020, now Pat. No. 11,007,815.

(60) Provisional application No. 62/887,220, filed on Aug. 15, 2019.

(51) Int. Cl.

*B01F 35/00* (2022.01)
*B01F 31/24* (2022.01)
*B01F 35/42* (2022.01)

(52) U.S. Cl.

CPC ............ *B01F 35/421* (2022.01); *B01F 31/24* (2022.01)

(58) Field of Classification Search

CPC ................................ B01F 35/421; B01F 3/24
See application file for complete search history.

(56) References Cited

U.S. PATENT DOCUMENTS

| | | | | |
|---|---|---|---|---|
| 3,430,927 A * | 3/1969 | Pouzar | B01F 29/81 366/231 |
| 3,773,227 A | 11/1973 | Laing et al. | |
| 3,802,607 A | 4/1974 | Mead | |
| 3,934,751 A | 1/1976 | Green et al. | |
| 3,964,634 A | 6/1976 | Jasinski et al. | |
| 4,165,014 A | 8/1979 | Ruscitti | |
| 11,007,815 B1 * | 5/2021 | Wrubel | B01F 35/422 |
| 2008/0067182 A1 | 3/2008 | Underwood et al. | |
| 2010/0051652 A1 | 3/2010 | Becker | |

* cited by examiner

*Primary Examiner* — Anshu Bhatia

(74) *Attorney, Agent, or Firm* — Carmody MacDonald P.C.; Dennis J M Donahue, III; Kevin C. Staed

(57) ABSTRACT

The adapter connects an aerosol or similarly shaped can to a power tool for the purpose of mixing the contents within the can. The adapter preferably connects a reciprocating power tool, such as a reciprocating saw, to a spray paint can that is necessarily shaken before use. To secure the can to the power tool, the adapter has multiple fingers that grasp the end of an aerosol can with respective tabs. The tabs catch on a ring on the topside of the spray paint can to prevent it from breaking away from the reciprocating tool during operation. To secure the adapter to the can, the fingers and tabs have a diameter that is smaller than the diameter of the can rim but deform into an oblong arrangement to receive the can before returning to the circular arrangement and locking the can in place. To deform the adapter, an actuator is connected to the side of the cylindrical body and the can is held in place until the actuator is actuated and the tabbed fingers can be pulled away from the can.

20 Claims, 6 Drawing Sheets

SHAKING ADAPTER FOR A POWER TOOL

CROSS-REFERENCE TO RELATED APPLICATIONS

This application is a continuation-in-part of U.S. patent application Ser. No. 16/991,895 filed on Aug. 12, 2020 which claims priority from U.S. Provisional Patent Application No. 62/887,220 filed Aug. 15, 2019, both of which are hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a tool adapter, and more particularly to an adapter for connecting and shaking an aerosol can with a reciprocating tool.

Related Art

Aerosol cans, such as spray paint cans, have long been used for dispensing paint. However, a shortcoming of such cans is the settling of the contents within the can after a period of storage that necessarily requires the mixing of the contents prior to use. Generally, aerosol cans contain a compressed propellant and a product that is intended to be dispensed, such as paint. To effectively operate, the contents should be mixed to prevent the propellant spraying out as a gas or the product oozing out of the can nozzle which in either case leads to product waste. Accordingly, it is known to shake aerosol cans in an effort to mix the product with the compressed propellant and eliminate waste caused by unmixed contents.

In most cases, the user simply shakes the can by hand and does not use a shaking device or system. Although potentially effective, the practice is limited to the physical shaking ability of the user and cannot be easily replicated from can to can or user to user. For example, an experienced painter or user who commonly uses aerosol paint cans may effectively mix the contents of the can to minimize waste. Conversely, an inexperienced painter or someone who does not routinely use aerosol paint cans may not effectively mix the contents of the can and therefore may unknowing waste product within the can that is not properly mixed. Accordingly, there is a desire to those having skill in the art to provide a mixing device that can effectively mix the contents of an aerosol can which can be replicated from can to can and user to user. Further still, it is a desire to provide a mixing device that can be quickly attached to and detached to the can in addition to providing a quick mixing process.

Some existing devices include specialized mixing machines, however, these specialized machines are costly to the average homeowner, who infrequently have a need to mix the contents of an aerosol paint can and cannot justify the expense and storage space required for a specialized paint shaking or mixing machine. Other less expensive devices have been developed for utilization by a common homeowner that attach to drills or reciprocating power tools, such as a Sawzall® reciprocating saw, and can be used by the homeowner to mixing the contents of the aerosol can. For example, U.S. Pat. Nos. 7,997,787 and 9,144,777 describe mounting devices that respectively connect to a reciprocating power tool and a drill.

In particular, the ’787 patent holds a can in a cradle and is secured therein with at least one strap. In operation, a shank extends from the cradle into a hand-held power tool which shakes the can when the power tool is powered on. Although this tool may effectively use a reciprocating power tool to mix the contents of the aerosol can, this attachment device necessarily requires a cradle having a large profile along with at least one strap to secure the can within the cradle. Accordingly, there are shortcomings with the device where it is necessarily large in size and requires added steps for the user to secure the can within the cradle.

Similarly, the ’777 patent includes a mounting device that connects to the bottom of a can with multiple fingers that lock onto the can with a strap or similar securing fastener. Subsequently, a drive shaft connected to the mounting device is connected to a power drill and the can is mixed as the power drill spins. Although this device improves over the ’787 patent by eliminating the cradle and thereby reducing the overall profile of the device and reduce the amount of parts needed, this system fails to effectively operate with a reciprocating power tool and is limited to use with a drill or other rotating tool. In particular, the fingers of the device are positioned over the end of the can and are secured with an external clasp or similar collar. However, the fingers do not include any tabs, teeth or other gripping means that hold onto the can beyond the static friction between the fingers and the sidewall of the can. Accordingly, the fingers do not grasp the can when the clasp is not engaged and repeated reciprocating motion may tend to cause the can to slip out of the fingers that are held in place by a friction fit only when the clasp is tightened.

More generally, numerous inventions directed to lids and safety caps releasably fasten to the top of aerosol cans. For example, U.S. Pat. No. 3,802,607 describes a child protective overcap that detachably fastens over the spray nozzle of an aerosol container with an inner shell that distorts and expands in such a manner as to release the overcap from the container in response to force applied to the side of an outer shell connected thereto by a web. Similarly, U.S. Pat. Nos. 3,773,227, 3,934,751, and US Pat. App. Pub. No. 2008/0067182 describe overcap designs that incorporate an inner shell that distorts and expands in such a manner as to release the overcap from the container in response to force applied to the top side of the overcap. Although both variations thereby allow an overcap to be releasably attached to the top of an aerosol can, neither the side-press nor top-press designs can be modified to operate as an adapter for a reciprocating tool without changing their principle of operation and rendering them unfit for their intended purpose.

Although effective at securing the overcap to the can when stationary, a particular problem would arise if the top-press design was modified according to the invention described herein because the momentum of the can in the reciprocating movement could result in sufficient force being applied to the top-press, resulting in the premature release of the can. Further still, all of the overcap designs require a hollow outer shell or bonnet that envelops the inner shell to reduce the risk of the overcap being knocked free from the can when the side-press or top-press are not pressed and to further secure the cap to the can by contacting the peripheral groove of the can beneath the rim of the can that surrounds the valve. Accordingly, removing or reducing the surface area of the hollow outer shell to facilitate faster release of the can from the cap so that it may be better suited to operate as an adapter for a reciprocating tool renders it unfit for its intended purpose.

Accordingly, there remains a need in current shaking systems and mounting devices that allow a user to quickly and easily modify a drill or reciprocating tool into a can shaking device. Although some current designs can effectively use either a drill or reciprocating device, there remains a need for an adapter that can be used with both type of power tools while still providing a quick release adapter with a small profile.

SUMMARY OF THE INVENTION

The adapter described herein removably connects an aerosol or similarly shaped can to a power tool for the purpose of mixing the contents within the can. The adapter preferably connects a reciprocating tool, such as a reciprocating saw, to a spray paint can that is necessarily shaken before use. To secure the can to the power tool, the adapter has multiple fingers that grasp the end of an aerosol can with respective tabs protruding from the end of each finger. These tabs catch on the rim on the topside of the spray paint can, proximate to the spray nozzle, to prevent it from breaking away from the reciprocating tool during operation. In one embodiment, a collar surrounds the fingers and tightens around the fingers to securely fasten them to the can. In another embodiment, the adapter itself fits around the rim of the can with the tabs grasping the rim and can subsequently can deform to release the can. Accordingly, a mechanical actuator connected around the cylindrical body or actuator integrated into the body itself allows the adapter to hold the can in place until the actuator is actuated and the tabbed fingers can be pulled away from the can.

To facilitate reciprocating motion, the adapter has a shank extending in the opposite direction from the fingers which connects to the power tool. Accordingly, when the shank is secured within the tool and a can is secured by the tabs and actuator, the can will be shaken when the tool is powered on and the adapter reciprocates back and forth.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
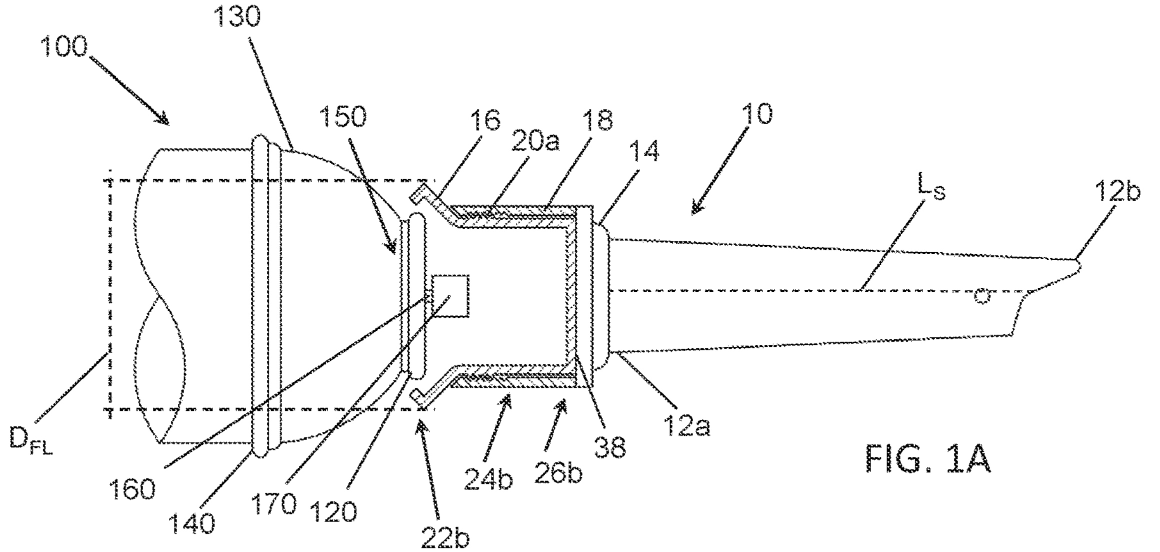
FIGS. 1A and 1B are side views of the adapter according to a first embodiment of the invention in an unlocked arrangement and a locked arrangement, respectively.

The following description of the preferred embodiment(s) is merely exemplary in nature and is in no way intended to limit the invention, its application, or uses.

The adapter 10 described herein releasably connects a can, such as an aerosol paint can 100, to a reciprocating tool 110, such as a reciprocating saw, so that the reciprocating tool can be used to shake the can and mix the contents therein. The can has a nozzle assembly 150 with a nozzle stem 160 and a nozzle actuator 170 that is mounted in the cup 130 at the top of the can and a circular rim 120 around the mounting between the cup and the nozzle assembly. The adapter in one embodiment includes multiple fingers 16 in a circular arrangement 42 that grasp the end of the aerosol can and engage thereon with tabs 34 at the end of each finger and an outer locking collar with a clamping connection 20*a*, 20*b*, 20*c*. To hold the can in place, the end of each finger includes an inwardly protruding tab that fits around the head of the can in an engaged orientation to prevent it from breaking away from the reciprocating tool during operation. In addition, the adapter may include an outer locking collar actuator that is tightened into a locked positioned which squeezes the fingers and tabs inwardly against the can, thereby engaging the tabs and inner side of the fingers with the can and preventing the can from moving as the tool reciprocates the can back and forth. Alternatively, an integrated side-press web actuator may translate between an actuated and unactuated position and similarly squeeze the fingers and tabs inwardly against the can, thereby engaging the tabs and inner side of the fingers with the can and preventing the can from moving as the tool reciprocates the can back and forth. Accordingly, the overall assembly acts as a collet, holding the can in place while providing an easier method for shaking the can when it is attached to a power tool.

Figure 5:
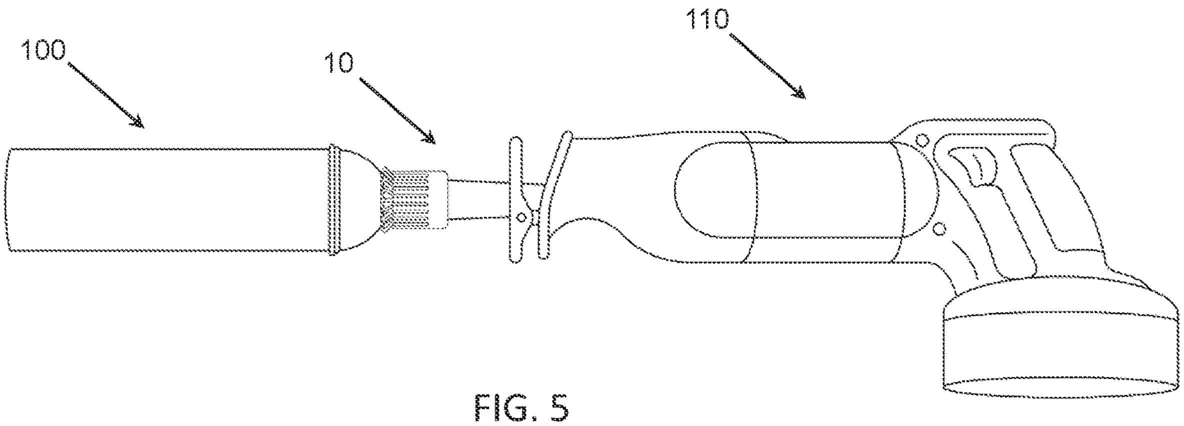
FIG. 5 is a side view of the adapter according to the present invention connecting an aerosol can with a circular rim to a reciprocating power tool.

According to the preferred embodiment, the adapter is used with a traditional aerosol paint can. Generally, such a can has a cylindrical body with a spray nozzle at the top end, as shown in FIG. 5. Although the overall shape of the can may vary, aerosol cans include a circumferential rim or ridge proximate to the spray nozzle that is formed during manufacture of the can. Where the spray nozzle generally does not change relative to can size, the rim proximate to the spray nozzle similarly does not change with most can embodiments. However, it will be appreciated by those having an ordinary skill in the art that the adapter described herein can be sized to connect with any aerosol paint can that may be a nonstandard size.

In the embodiments shown in FIGS. 1-5, the fingers are biased outwards as shown in FIGS. 1A, 2A, 3A, and 4A, and the tabs can be placed over the rim 120 and release from the rim when the collar is loosened. When the collar is tightened, it forces the fingers inwardly as shown in FIGS. 1B, 2B, 3B, and 4B; the fingers grasp onto the can with each tab engaging a portion of the rim on the top of the can that surrounds the spray nozzle. Each tab has an angular tip 44 between a pair of intersecting planes $P_a$, $P_b$ that are askew from the shank's longitudinal axis to help secure the grip around the rim of the can. The collar surrounding the fingers is tightened and forces the fingers inwardly to a slightly smaller diameter $D_{FS}$ than the larger diameter $D_{FL}$ of the fingers in their biased outward arrangement when the collar is loosened. Thus, the can is secured as the engaged fingers exert a clamping force on the can. As the collar is tightened, the diameter of the fingers reduces and static friction holds the can in place along with the protruding tabs that prevent longitudinal movement of the can past the tabs as the tool produces the reciprocating motion.

The adapter includes a shank 12, a head 14, fingers for engaging the can, and an actuator which may be a collar 18 surrounding the fingers that locks the adapter to the can or an integrated side-press web. The head is preferably circumferential, includes a top section 30 and a cylindrical section 32 and is situated around a longitudinal axis 28. To connect the adapter to the power tool, the shank extends along this longitudinal axis from a center portion 36 of the top section of the head and removably connects to the chuck, blade holder or similar mounting point commonly used in power tools, such as a drill or reciprocating saw. The shank extends a length $L_s$ from the top section of the head at the proximal end 12*a* of the shank to the distal end 12*b* of the shank that engages the power tool. Accordingly, when the tool is powered on, the adapter spins or reciprocates in place of the standard bit or blade that is commonly connected to the power tool. The cylindrical section of the head extends from a perimeter 38 of the top section of the head, opposite the side of the shank.

Multiple fingers extend from the opposite side of the head from the shank at the end of the cylindrical section that is opposite of the end proximal to the perimeter of the head. Each of the fingers include a proximal end 16*a* connected to the cylindrical section, a distal end 16*b* that engage the rim of the can, and a tab. The proximal and distal ends are separated by the length Lf of the fingers which extend in the opposite direction 40 from the shank distal end. The fingers are radially spaced in a circular arrangement 42 and the tabs on each finger protrude inwardly from the distal end of each finger towards the longitudinal axis and engage the can as shown in FIGS. 1B, 2B, 3B, and 4B. As the tabs engage the underside of the rim, a portion of the length of the fingers' distal end may also contact a portion of the rim sidewall and hold the can in place with static friction while the tabs snap over and engage the rim of the can. Even without any frictional force being applied by the fingers against the rim sidewall, the tabs still hold the can in place and prevent longitudinal movement of the can past the tabs because the diameter of the tabs is less than the diameter of the rim when the collar is tightened and the ends of the fingers are forced inwardly.

Figure 1B:
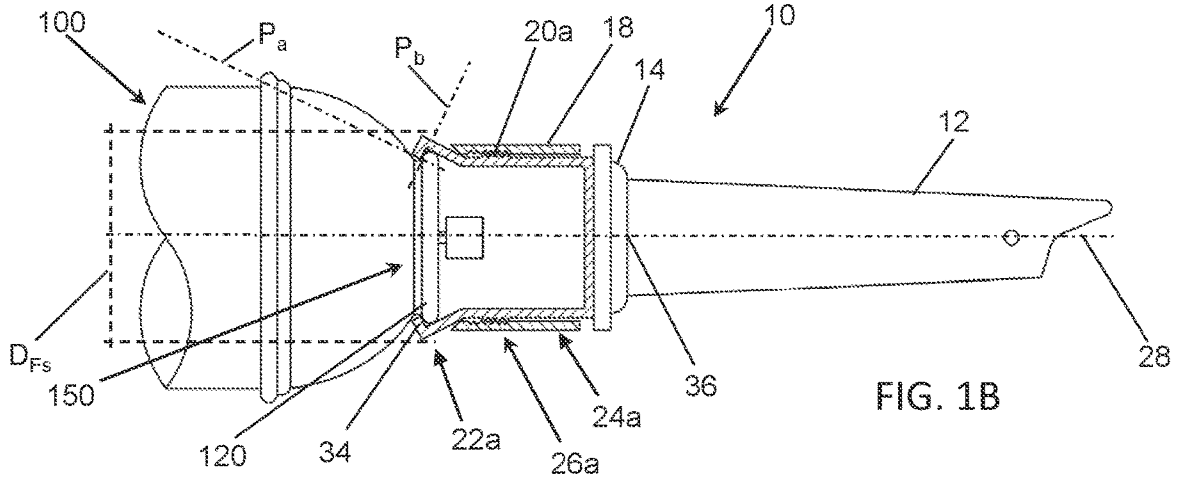
Figure 1C:
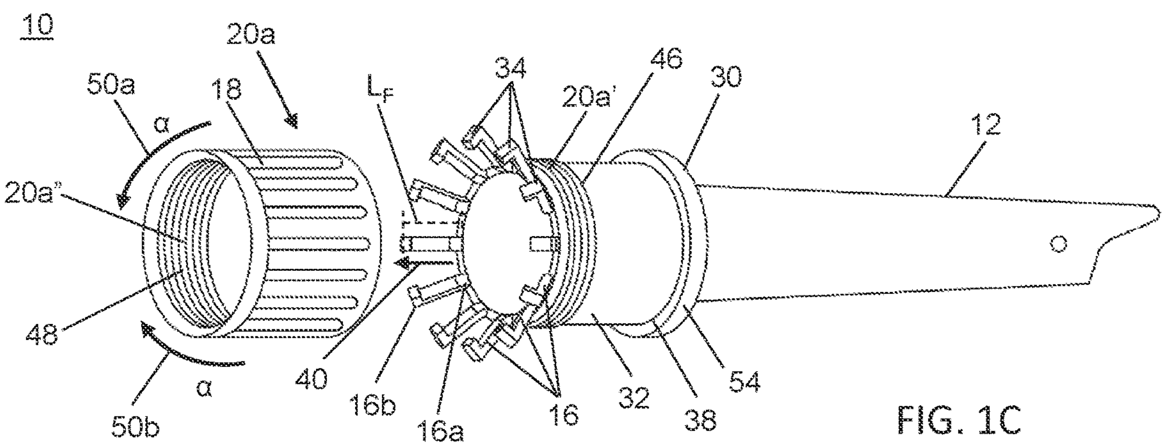
FIG. 1C is an exploded perspective view of the adapter shown in FIGS. 1A and 1B.
Figure 2A:
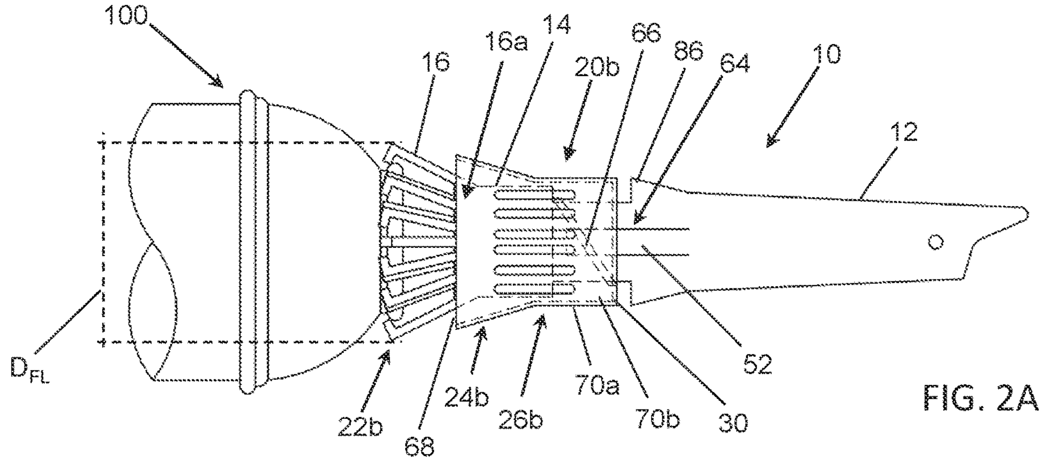
FIGS. 2A and 2B are side views of the adapter according to an alternative embodiment in the unlocked arrangement and locked arrangement, respectively.
Figure 2B:
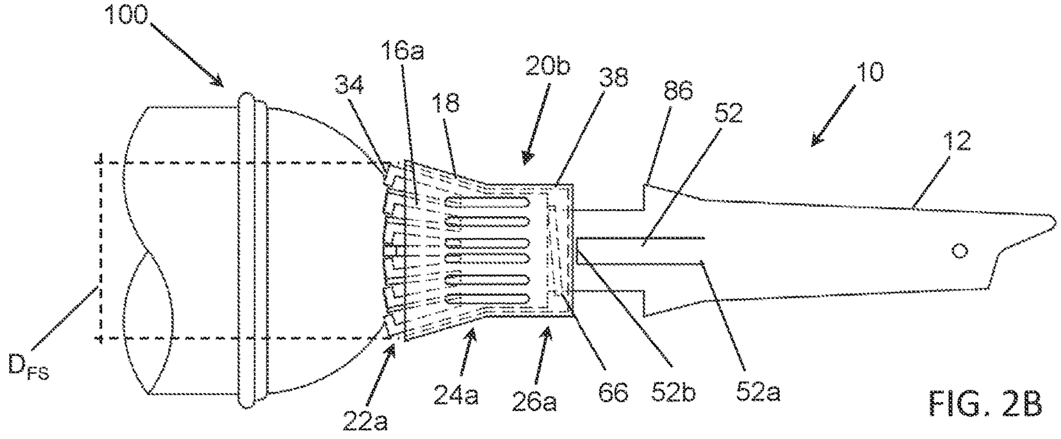
Figure 2C:
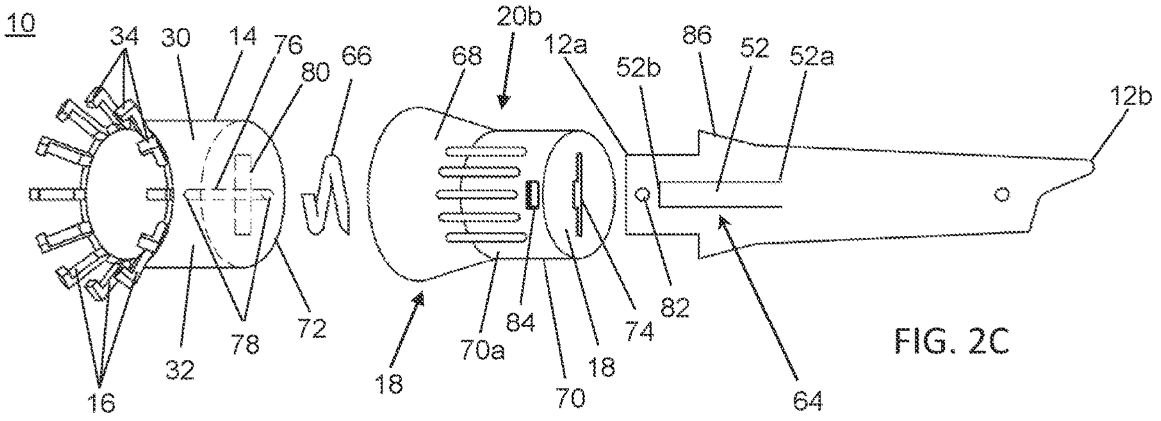
FIG. 2C is an exploded perspective view of the adapter shown in FIGS. 2A and 2B.
Figure 3A:
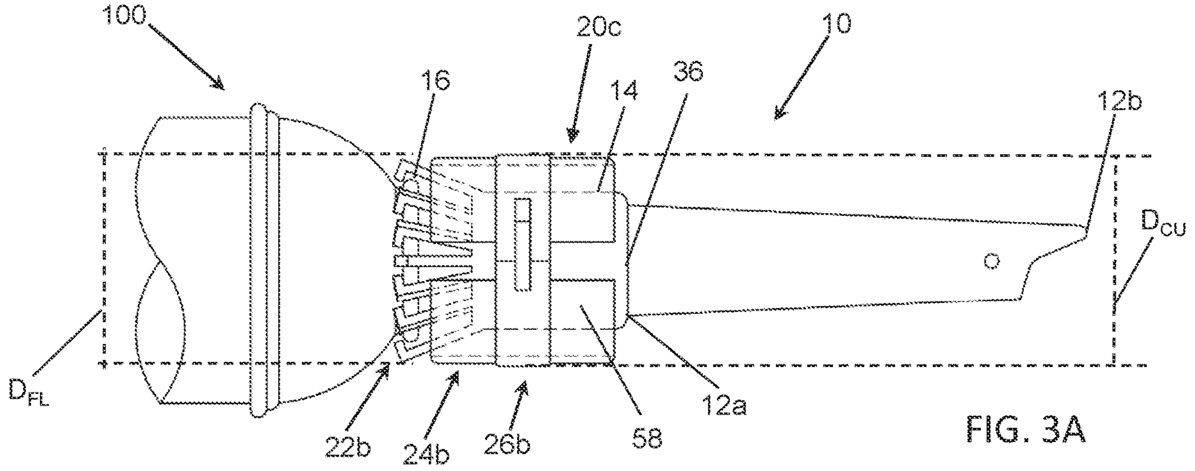
FIGS. 3A and 3B are side views of the adapter according to another alternative embodiment in the unlocked arrangement and the locked arrangement, respectively.
Figure 3B:
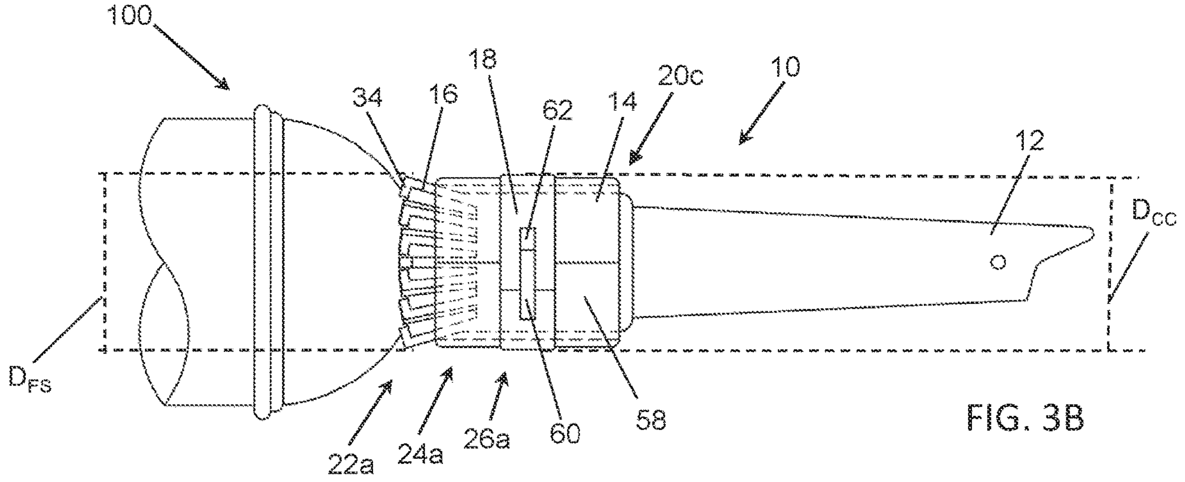
Figure 3C:
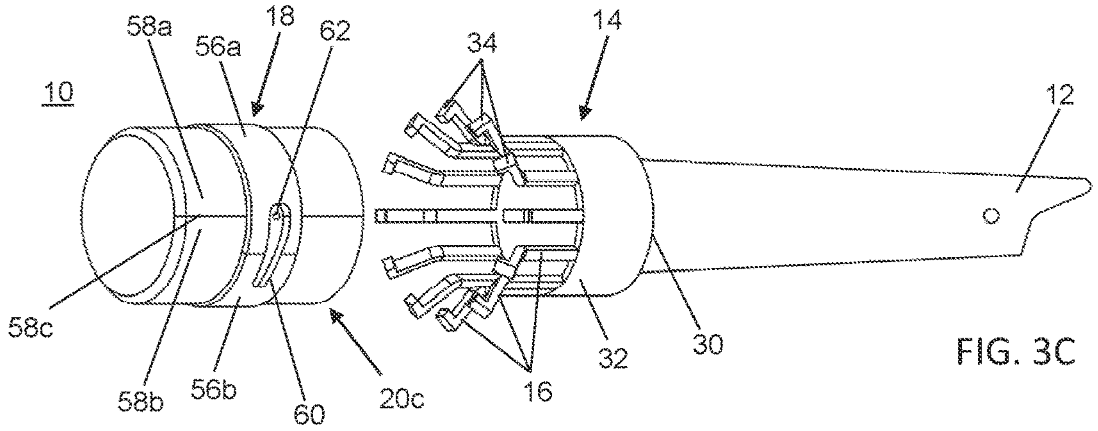
FIG. 3C is an exploded perspective view of the adapter shown in FIGS. 3A and 3B.

As the head and fingers are preferably circumferential, as shown in FIGS. 1C, 2C, and 3C, the fingers have the smaller diameter when the fingers are in an engaged orientation 22*a*, engaging the rim of the aerosol can and gripping the can in place, and the larger diameter when the fingers are in a disengaged orientation 22*b*, where the fingers have released the rim of the can as shown in FIGS. 1A, 2A, 3A, and 4A. The collar surrounds the fingers and rotates between the tightened position 24*a* and loosened position 24*b* as the fingers move between the engaged position clamping onto the rim and the disengaged position releasing from the rim, respectively. As referenced above, rotating the collar into the tightened position forces the tabs inwardly together towards the longitudinal axis in the engaged orientation, reducing the diameter of the fingers and tabs and causing the fingers and tabs to engage the rim of the can and thus connecting the can to the adapter. Conversely, rotating the collar into the loosened position releases the fingers and tabs and allows them to spread away from the longitudinal axis in the disengaged orientation, causing the fingers and tabs to disengage from the can rim and allowing the user to remove the can from the adapter. During operation, the can is inserted between the fingers and the collar is in the tightened position. The power tool attached to the shank of the adapter is then powered on and the can is subsequently shaken. Once the shaking process is complete and the contents within the can are sufficiently mixed, the collar is moved to the loosened position to disengage the fingers and tab from the can, and the can is ready for use.

When the top of the can is inserted into the fingers of the adapter, the circumferential rim preferably biases the fingers outwardly until the respective tabs snap over the rim and loosely hold the can. Accordingly, even when the collar is in the loosened position, the adapter can at least loosely hold the can in place to allow the user to use one hand in fitting the can into the adapter and subsequently moving the collar into the tightened position. Alternatively, the diameter of the fingers may be larger than the diameter of the can rim when unlocked and the tabs may not engage the can until the collar is moved into the tightened position and the finger diameter reduces, engaging the fingers and tabs around the can. In such an embodiment the user necessarily uses two hands wherein the user holds the top of the can proximate to the fingers with one hand and subsequently moves the collar into the tightened position with the other hand. Thus, it is preferred to have the tabs snap over the rim and loosely hold the can wherein the user can insert the can and subsequently move the collar into the loosened position with the same hand.

The clamping connection may be made from any number of releasable clamps and fasteners that move between a locked position 26*a* in which the clamp holds the collar in place in the tightened position and an unlocked position 26*b* in which the clamp releases the collar in the loosened position. For example, the clamping connection 20*a*, 20*b*, 20*c* can be made from any number of releasable clamps and fasteners, which could consist of mating threads, a shank stop, and an over-center latch. The clamping connection moves between a locked position where it holds the collar in place in the tightened position, and an unlocked position 26*b* where it releases the collar into the loosened position. The preferred embodiment shown in FIGS. 1A-1C is a threaded collar embodiment which includes a set of mating threads 20*a* in which a first set 20*a*' of mating threads engages the second set 20*a*" of threads to hold the can in the collar tightened position. The first set of mating threads is located on an outer sidewall 46 of the cylindrical section of the head while the second set of mating threads is located on an inner sidewall 48 of the collar. Screwing the collar around the cylindrical section in a tightening direction 50*a* moves the collar towards the distal ends of the fingers until the clamping connection is in the locked position. Screwing the collar around the cylindrical section in a loosening direction 50*b* moves the collar towards the distal end of the shank until the clamping connection is in the fully unlocked position. The head preferably includes a flange 54 which is situated around the perimeter, and the collar abuts against the flange when the collar is in the unlocked position. As referenced above, screwing the collar in the tightening direction forces the fingers and tabs inwardly together in the engaged orientation while screwing the collar in the loosening direction releases the fingers and tabs in the disengaged orientation.

Figure 4A:
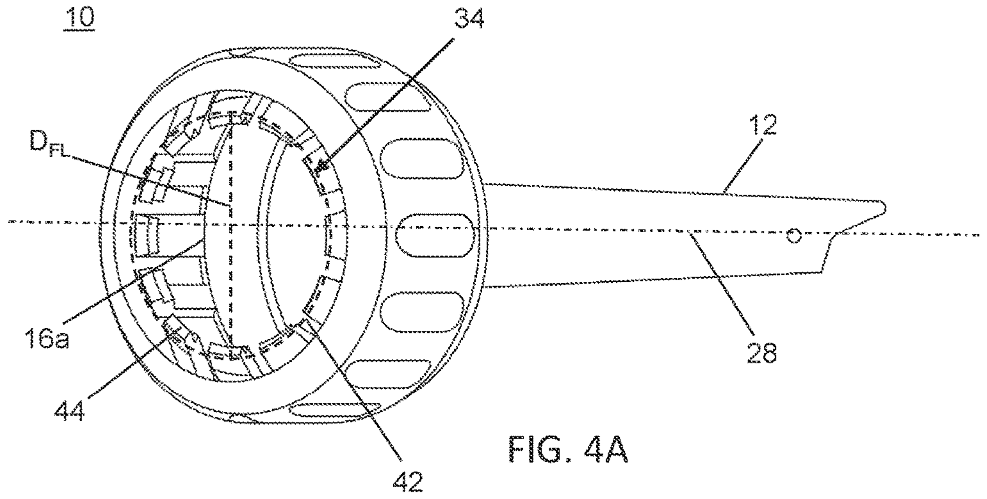
FIGS. 4A and 4B are perspective views of the adapter in the unlocked arrangement and the locked arrangement, respectively.
Figure 4B:
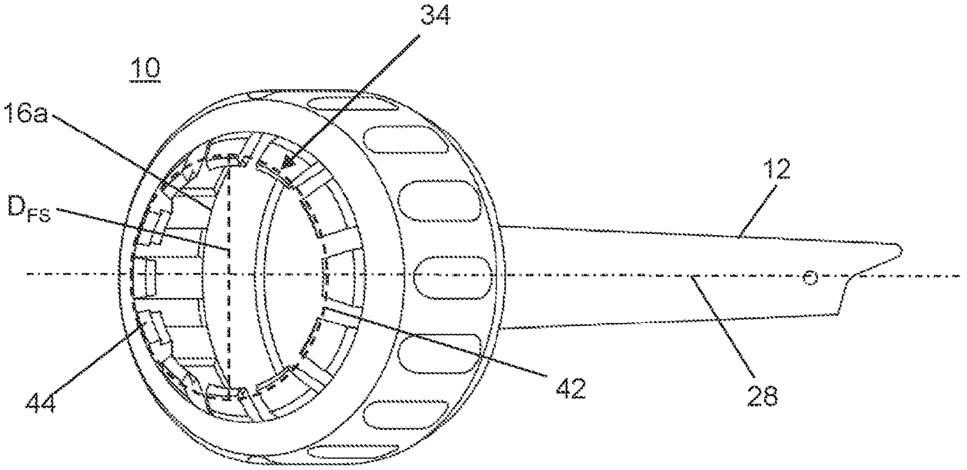

In embodiments that use a threaded collar, the direction of rotation is not intended to be limiting. For example, FIGS. 1A-1C show a threaded collar that forces the fingers inwardly as the collar moves towards the distal ends of the fingers and allows the fingers to flare outwardly as the collar moves away from the distal ends of the fingers towards the shank. In comparison, FIGS. 4A and 4B show an alternative threaded collar which forces the fingers inwardly as the collar moves towards the shank and allows the fingers to flare outwardly when the collar moves towards the distal ends of the fingers. Regardless of the direction of rotation to produce the clamping of the fingers, the degree of rotation (α) is preferably less than two hundred and seventy degrees (α<270°) as the collar moves between the locked position and the unlocked position, i.e., a three-quarter rotation or less (not even a full 360° rotation). It will be appreciated that the particular thread configuration may vary without departing from the scope of the present invention.

An alternative adapter embodiment 20*b* shown in FIGS. 2A-2C has a collar that translates relative to the head and the fingers by a sliding motion rather than rotating around thread as in the embodiment described above with reference to FIGS. 1A-1C. In this embodiment, the shank includes a stop 64 that secures the collar in the locked position over the fingers as shown in FIG. 2B so that the fingers are forced inwardly around the rim of the can. When the stop is released, the collar slides back away from the fingers which are then able to flare outwardly and disengage from the rim of the can as shown in FIG. 2A. Preferably, a spring 66 is positioned between the collar and the head so that the collar is biased back away from the fingers when the stop is released.

The collar has a cylindrical body 68 that is situated around the cylindrical section of the head and surrounds at least a portion 16*a* of the fingers and also has a cap 70 that is situated on an end 72 of the cylindrical body proximate to the top section of the head. The cap includes an interior side 70*b* and an exterior side 70*a* along with an aperture 74. The interior side of the cap is positioned proximate to the top section of the head 14. The proximal end of the shank protrudes through the aperture in the cap, and the stop is attached to the shank. The stop is released by being pressed inwardly towards the shank so that it fits within the aperture, and the spring, located between the top section of the head and the interior side of the cap, then forces the collar back away from the fingers. When the collar is pushed towards the fingers and the aperture moves past the stop, the stop is biased away from the shank and engages the exterior side of the cap adjacent to the aperture. It will be appreciated that the spring could be a flat spring or a coil spring, and the stop is preferably a tang 52 with a fixed end 52*a* attached to the shank and a free end 52*b* that is biased outwardly from the shank. When the collar is in its locked position, the tang's free end serves as the stop, engaging the exterior side of the cap and preventing it from moving. When the tang's free end is moved towards the shank to fit within the aperture, the spring biases the collar towards the loosened position in which the clamping connection is unlocked.

The shank 12 with the tang 52 is preferably mounted to the head 14 by a pin 76 supported by opposing sidewalls 78 of the head. The proximal end of the shank extends through the aperture in the collar and through another aperture 80 in the top section of the head that is aligned with the aperture in the collar. The pin extends through a hole 82 in the proximal end of the shank. To facilitate insertion of the pin into the head while the shank is extends through the apertures, the collar may have a window 84 that may be closed after the pin is inserted. The shank also preferably includes a flared section 86 adjacent to the proximal section of the shank that fits into the aperture. The flared section limits the travel of the collar on the shank when the stop is released and that collar moves back from the fingers. It will also be appreciated that the shank could connect to a clip or other fastener mounted to the top section of the head rather than being inserted through another aperture to the pin.

Another alternative clamping connection embodiment has a clamp that uses an over-center latch assembly 20*c* situated around the collar, such as shown in FIGS. 3A, 3B, and 3C. In this embodiment, the collar is a split collar 58 with a pair of ends 58*a*, 58*b* bounding a slit 58*c* on at least one side of the collar. The collar has a clamped diameter $D_{CC}$ with the pair of ends drawn towards each other by the lever 60 in the locked position and an unclamped diameter $D_{CU}$ with the pair of ends pushed away from each other by the lever in the unlocked position, and wherein the second diameter is greater than the first diameter. In the particular embodiment shown in FIGS. 3A-3C, the over-center latch includes a circumferential band 56 that surrounds the plurality of fingers. The lever is pivotally attached to one end 56*a* of the band, and an anchor is fixedly attached to another end 56*b* of the band. When the clamping connection is in the locked position, the band exerts a force on the fingers that pushes them inwardly towards the shank's longitudinal axis in their engaged orientation. When in the locked position, the lever engages the anchor and pulls the band tight with a reduced diameter, moving the collar into the tightened position. Conversely, when the clamping connection is unlocked, the lever is disengaged from the anchor and the band is loosened with a larger diameter wherein no force is applied to the fingers and the fingers release the can, moving the collar into the loosened position. Other variations of over-center levered latches are described in U.S. Pat. Nos. 4,008,937, 3,964,774, 3,776,579, 3,423,095, 3,163,900, and 1,646,463 which are hereby incorporated by reference.

An alternative adapter embodiment shown in 6A-6C includes side-web press actuator in place of the collar actuator shown in the other drawings and described above but otherwise includes the shank, head, fingers and tabs to releasably secure a can to a reciprocating tool. In place of the screw-on collar, slide-on collar and over-center latch clamp the side-press web actuator is preferably integrated with the cylindrical body of the head and translates between an unactuated position and an actuated position to move the tabs between the engaged orientation 22*a* and the disengaged orientation 22*b*. In operation, the distal perimeter of the cylindrical section 32 and the fingers 16 and tabs 34 connected thereto are biased into the circular arrangement 88*a* with a uniform circular diameter ($D_{CA}$) when the side-press web actuator is in the unactuated position and deforms into an oblong arrangement 88*b*. In the oblong arrangement, the cylindrical section approximates an ellipsis with a major axis ($E_{maj}$) that is longer than the minor axis ($E_{min}$). The major axis of the ellipsis is also longer than the diameter of the cylindrical section when it is not being deformed ($E_{maj}>D_{CA}$), and the diameter of the cylindrical section is greater than the minor axis ($D_{CA}>E_{min}$).

The side-press web actuator includes a pair of side-press webs 90 situated on opposite sides of the cylindrical section that when depressed with a force (F) applied to the grips, deform the distal perimeter of the cylindrical section and the fingers and tabs connected thereto into the oblonaged arrangement and allow the can to be attached or released. Each side-press web includes a grip 90*a* connected to the cylindrical section by a rib 90*b* that radially extends a rib length ($L_R$) from an inner edge 92*a* connected to the cylindrical section to an outer edge 92*b* connected to the grip. Accordingly, the grip is radially spaced from the cylindrical section by the rib length. Each rib also includes a rib height ($H_R$) between a top 94*a* and bottom end 94*b* respectively proximate to the shank and distal perimeter and is substantially perpendicular to the longitudinal axis. Accordingly, the bottom end of the rib terminates at or before the distal perimeter of the cylindrical section and does not interfere with the fingers or spaces there between.

The shape of the grip may be planar, may match the curvature of the cylindrical section that it partially surrounds or may other shapes such so that it may receive the radial force from the users as they actuate the actuator to deform the cylindrical section as described to release a connected can or connect a new can. Further still, the outer surface of the grip may be outfitted with gripping ridges, depressions, projections or any other gripping surface that better allows a user to grip the adapter during use. In addition, it will be appreciated by those having an ordinary skill in the art that the single rib in each side-press web described herein may be redesigned to include multiple ribs which connect the grip to the cylindrical section and provide additional support thereto. For example, U.S. Pat. No. 3,802,607 describes a similar design incorporating two ribs and such a design or variations thereof could be used in this embodiment; accordingly, the '607 patent is incorporated by reference.

Although the number of fingers and corresponding tabs may vary, the preferred version of this alternative embodiment includes a pair of fingers extending from the distal perimeter of the cylindrical body and corresponding tabs protruding from the end of the fingers. The fingers and tabs are situated opposite from one another and are bisected by a first plane extending through the longitudinal axis that is perpendicular to a second plane aligned with the side-press web. Accordingly, when the side-press web is actuated and moves within the second place, the tabs move away from the longitudinal axis within the first plane and disengage opposite sides of the container rim.

Figure 6A:
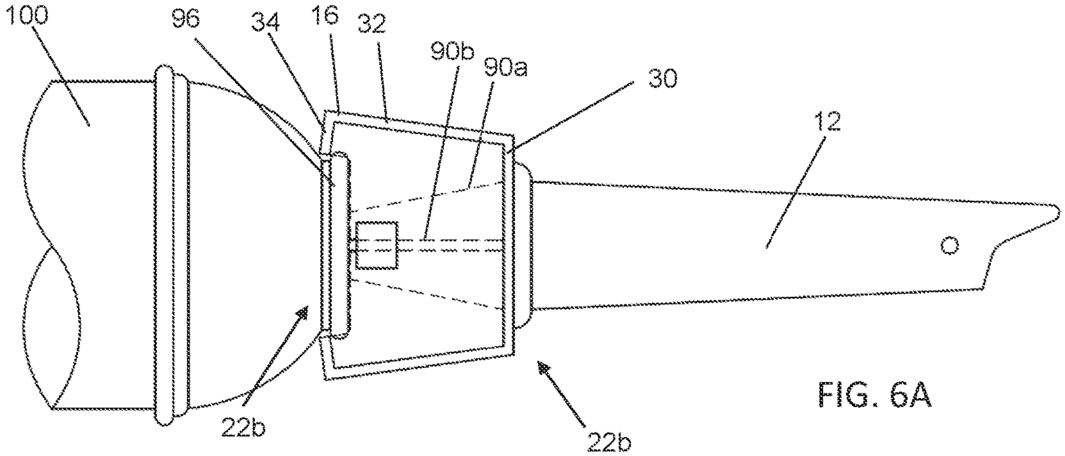
FIGS. 6A and 6B are side views of the adapter according to another alternative embodiment in the unlocked arrangement and the locked arrangement, respectively.
Figure 6B:
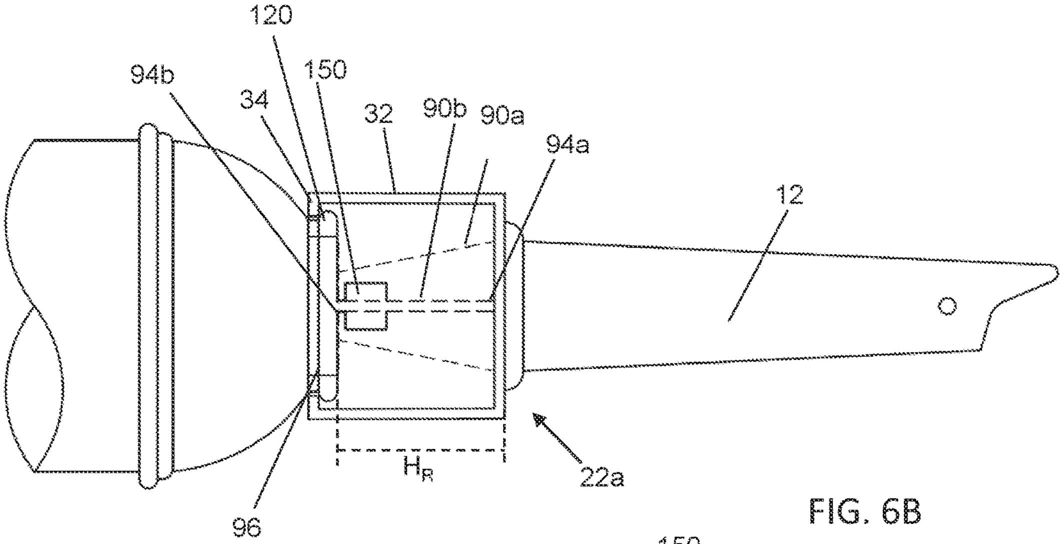
Figure 6C:
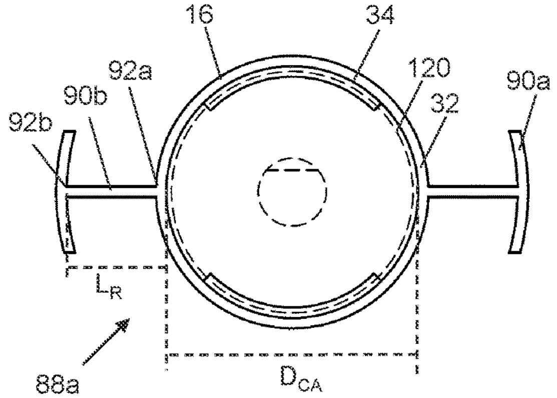
FIGS. 6C and 6D is a top detail views of the adapter in the unlocked arrangement and the locked arrangement, respectively.
Figure 6D:
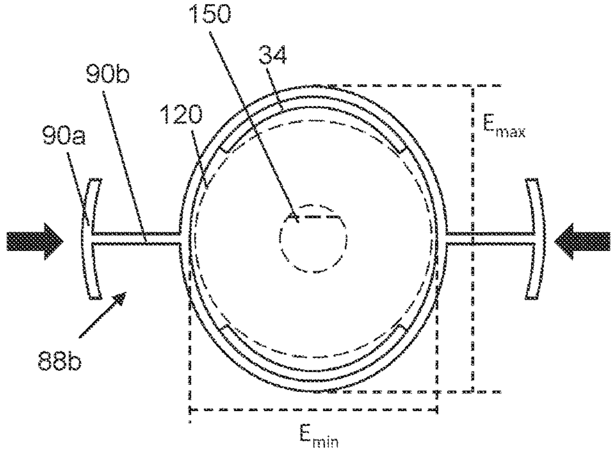

To allow sufficient clearance for the cylindrical section of the head to move as the side-press web is actuated, spaces 96 are provided between the pair of fingers and the second plane is thereby devoid of any legs. Each space has a length between the edges of the adjacent fingers which preferably less than the length of the fingers themselves. Thus, when the side-press webs are squeezed by a user the cylindrical section deforms into the oblong shape with the spaces moving closer to the longitudinal axis and rim and the tabs moving away from the longitudinal axis and rim and shown in FIG. 6D. Accordingly, the rim of the can is detached from the adapter and a new can may be inserted into the adapter which secures thereto when the grips are release and the cylindrical section returns to its circular arrangement with the tabs engaging the rim of the can.

Figure 7A:
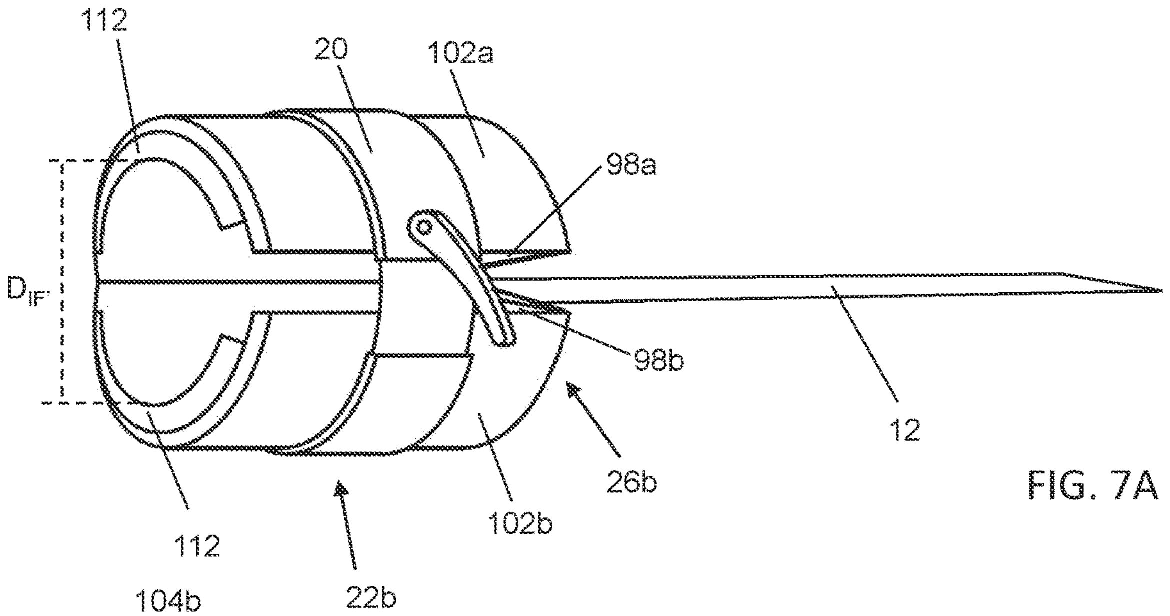
FIGS. 7A and 7B are side views of the adapter according to another alternative embodiment in the unlocked arrangement and the locked arrangement, respectively.
Figure 7B:
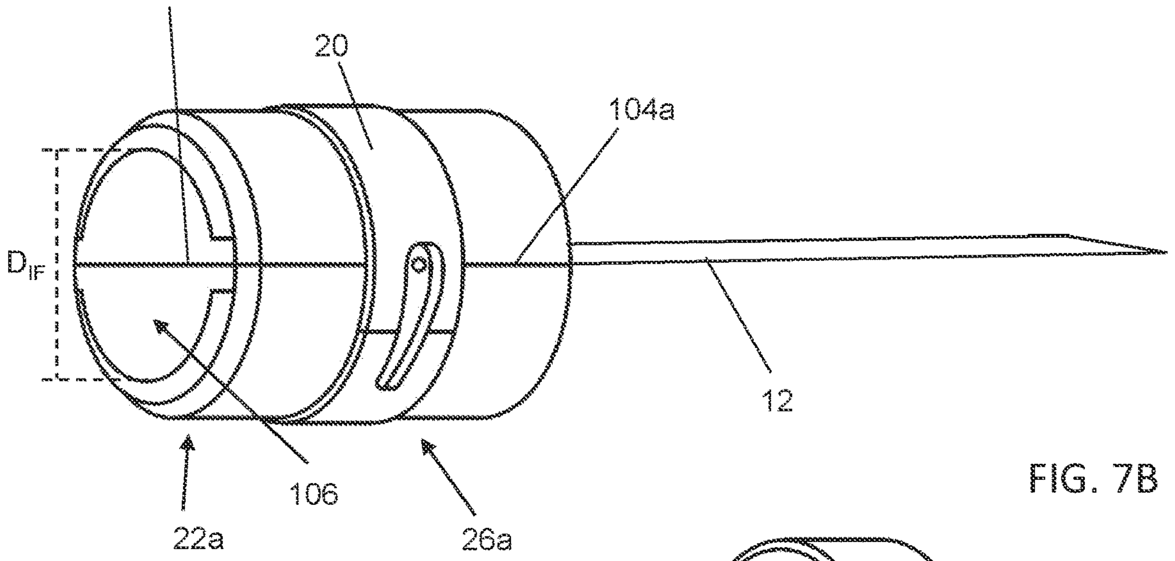

Another alternative adapter embodiment is shown in FIG. 7 and another variation of the embodiments which have a plurality of fingers that move relative the movement of the collar or side-press webs. This clamshell adapter has a head with a pair of split top sections 98*a* and 98*b* and a pair of split cylindrical sections 102*a* and 102*b*. Each split cylindrical section has opposing edges 104*a* and 104*b* that span the distance between the corresponding split top section and open distal end 106. A hinge 108 is provided at a location along one of the abutting pair of edges of the split sections and an actuator connects the edges opposite from the hinge allowing the split cylindrical sections to move between an engaged orientation and a disengaged orientation in a clamshell fashion. In operation, the split sections pivot open as shown in FIG. 7A and pivot closed as shown in FIG. 7B to engage and release the rim of the can. In place of the multiple fingers and respective tabs that grasp the rim on the top of the can around the spray nozzle, the distal ends of each split section include U-shaped inwardly facing integrated flanges 112 that engage the rim of the can when the split sections are closed. Accordingly, in this embodiment, each split section can be considered a finger, and the flanges are a type of tab that extend inwardly. To connect the adapter to the tool as described above, the tang connects to the one of the split top sections of the head which is preferably split along the diameter of the top section. This embodiment includes a diameter at the distal end between the integrated flanges ($D_{IF}$) that is less than the diameter of the rim and distal end of the clamshell adapter sections ($D_{IF'}$) when the clasp actuator is unlocked.

Figure 7C:
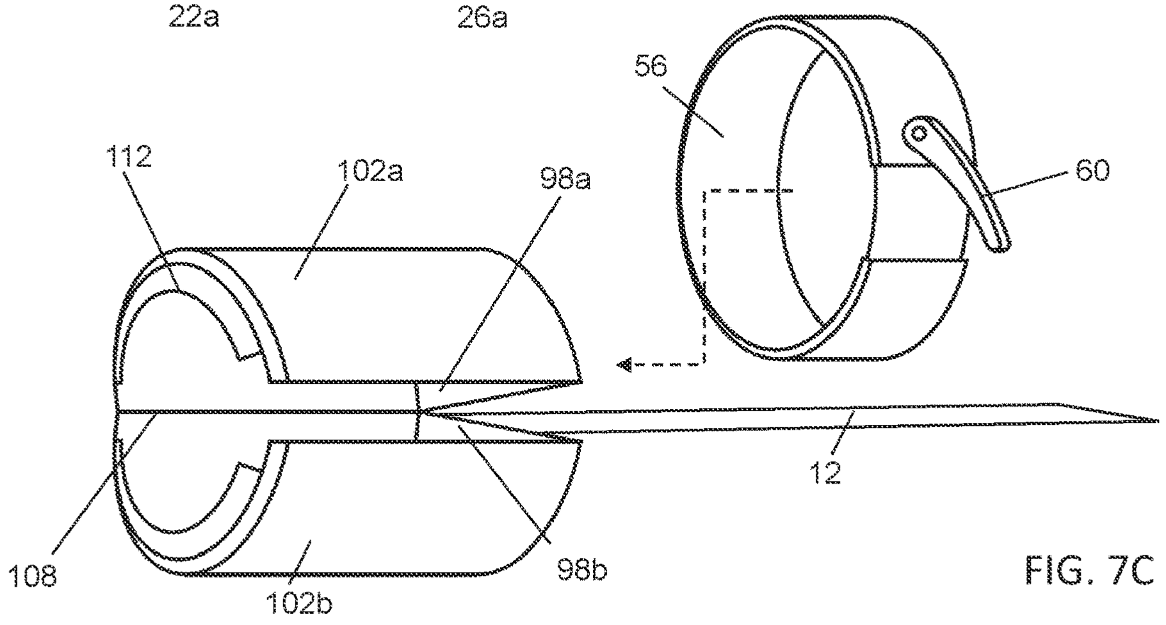
FIG. 7C is an exploded perspective view of the adapter shown in FIGS. 7A and 7B.

As shown in FIG. 7C, the actuator may be a separable lever that surrounds the split cylindrical sections of the head and thereby locks the head in the engaged orientation when the lever is fastened and allows the head to move to the disengaged orientation when the lever is released. Further, the hinge preferably biases the split sections outwardly so that the flanges disengage from the rim as soon as the lever is loosened. Alternatively, the actuator may be integrated with the split cylindrical sections themselves rather than be a separable collar as shown in the drawings. In this fully integrated alternative embodiment, a catch may be provided on one of the split sections and a lever may be provided on the other section. It will be appreciated that the split collar mechanism could also have an inwardly facing flange or may have tabs that extend inwardly from the distal end of the collar so that there would be no need for fingers in this alternative embodiment.

In another alternative embodiment, the adapter may operate with a solid cylindrical section and flange around the distal end wherein rather than locking and unlocking the clamping connection of the adapter with a movable cylindrical section, fingers and collar, the flange at the distal end of the cylindrical section of the head may be simply snapped over the rim and the can is sufficiently engaged with the friction fit between the distal end of the engagement portion and the protruding flange. Although less secure than embodiments having a locking collar and shell or fingers having a radial force applied to the sides of the rim as explained above, this embodiment is even simpler and does not require any moving parts within the adapter yet improves on other known adapters where it secures with a friction fit in addition to protecting against longitudinal movement of the can where the rim cannot move past the protruding flange.

Although it is intended that the adapter be used with a traditional power tool, such as a reciprocating saw as shown in FIG. 5, it will be appreciated that such an adapter could be readily used with other types of actuators. In particular, the adapter could be connected to a jigsaw, powered filet knife, or could connect to a drill through a reciprocating saw attachment. Further still, a standard reciprocating motor could be modified to accept the adapter and an entire shaking system could be developed rather than merely combining the adapter with a traditional tool. Such a system may be preferred by users who routinely need to shake aerosol paint cans, such as utility locators who are required to mark certain areas where utilities are located.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the present invention is shown with an adapter that clamps onto the rim around the valve assembly in the cup of the aerosol can, it will be appreciated that a larger version of the adapter could clamp onto the rim 140 around the cylindrical portion of the aerosol can where the base portion of the cup mounts to the can. Although the larger size adapter would allow the can to be shook while the cap covers the cup and nozzle assembly, the larger size adapter would also have more material, weight, and inertia so it would likely cost more and could be more wearing on the power tool and the operator of the tool. Thus, the breadth and scope of the present invention should not be limited by any of the above-described exemplary embodiments, but should be defined only in accordance with the following claims appended hereto and their equivalents.

What is claimed is:

1. An adapter for connecting an aerosol can with a circular rim to a tool, comprising:

a shank comprising a shank proximal end and a shank distal end, wherein the shank extends a shank length along a longitudinal axis from the shank proximal end to the shank distal end, and wherein the shank distal end releasably engages the tool;

a head comprising a top section and a cylindrical section, wherein a center portion of the top section is connected to the proximal end of the shank and is aligned with the longitudinal axis of the shank, wherein the cylindrical section extends a first distance away from the shank and comprises a distal perimeter situated around the longitudinal axis;

an actuator connected to the cylindrical section, wherein a first position and a second position of the actuator move at least the distal perimeter of the cylindrical section between an engaged orientation and a disengaged orientation;

a plurality of fingers attached to the distal perimeter of the cylindrical section at a finger proximal end and extending a second distance to a finger distal end, wherein the fingers are spaced from the shank proximal end by the top section and the cylindrical section of the head; and a plurality of tabs attached to the plurality of fingers, wherein each one of the tabs is comprised of a tab proximal end attached to a corresponding finger distal end and a tab distal end extending inwardly from the finger distal end to a position closer to the longitudinal axis than the distal perimeter of the cylindrical section, wherein the finger distal end and the tab distal end contact the circular rim of the aerosol can when the cylindrical section is in the engaged orientation, and wherein at least one tab distal end of one of the tabs disconnects from the circular rim of the aerosol can when the cylindrical section is in the disengaged orientation.

2. The adapter of claim 1, wherein the actuator is selected from the group of devices consisting of a screw-on collar, a slide-on collar, an over-center latch clamp, and a side-press web actuator.

3. The adapter of claim 2, wherein the distal end of the fingers are situated in a circular arrangement having a first diameter in the engaged orientation and a second diameter in the disengaged orientation, and wherein the second diameter is greater than the first diameter.

4. The adapter of claim 2, wherein the head further comprises a first plane bisecting a pair of opposing tabs from the plurality of tabs on opposite sides of the longitudinal axis and a second plane perpendicular to the first plane, wherein the actuator translates within the second plane between an actuated position and an unactuated position and moves the pair of opposing tabs between the engaged orientation and the disengaged orientation within the first plane, and wherein the second plane is devoid of any of the plurality of fingers.

5. The adapter of claim 4, wherein the distal perimeter of the cylindrical section comprises a circular arrangement when the actuator is in the unactuated position, and wherein the distal perimeter of the cylindrical section comprises an oblong arrangement when the actuator is in the actuated position.

6. The adapter of claim 4, wherein side-press web actuator consists of a pair of side-press webs on opposite sides of the cylindrical section, wherein the pair of side-press webs each comprise a rib and a grip, wherein the ribs are situated within the second plane on opposite sides of the longitudinal axis and radially extend a rib length between an inner edge connected to the cylindrical section to an outer edge connected to the grip, and wherein the rib vertically extends a rib height perpendicularly to the longitudinal axis between a top end and a bottom edge respectively proximate to the shank and the distal perimeter.

7. The adapter of claim 4 further comprising a plurality of spaces having a space length between each of the plurality of fingers, wherein each of the fingers comprise a finger length extending between the spaces, wherein the space length is less than the finger length, and wherein the second plane bisects a pair of spaces from the plurality of spaces.

8. The adapter of claim 6, wherein the distal perimeter of the cylindrical section is biased into the circular arrangement when the pair of side-press webs are in the unactuated position, and wherein a radial force applied to the grip moves the pair of side-press webs into the actuated position.

9. The adapter of claim 4, wherein the rib length and rib height are no greater than the first distance, and wherein the shank length is greater than the first distance.

10. The adapter of claim 1, wherein tabs further comprises an angular tip between a pair of intersecting planes.

11. An adapter for connecting an aerosol can with a circular rim to a tool, comprising:

a shank comprising a shank proximal end and a shank distal end, wherein the shank extends a shank length along a longitudinal axis from the shank proximal end to the shank distal end, and wherein the shank distal end releasably engages the tool;

a head comprising a top section, a cylindrical section and a first plane and a second plane bisecting the cylindrical section perpendicularly to one another, wherein a center portion of the top section is connected to the proximal end of the shank and is aligned with the longitudinal axis of the shank, wherein the cylindrical section extends a first distance away from the shank and comprises a distal perimeter situated around the longitudinal axis;

an actuator connected to the cylindrical section, wherein the actuator comprises a pair of side-press webs having a rib and a grip, wherein the ribs are situated within the second plane on opposite sides of the longitudinal axis and radially extend a rib length between an inner edge connected to the cylindrical section to an outer edge connected to the grip, wherein the rib vertically extends a rib height perpendicularly to the longitudinal axis between a top end and a bottom edge respectively proximate to the shank and the distal perimeter, wherein the actuator translates within the second plane between an actuated position and an unactuated position and moves at least the distal perimeter of the cylindrical section between an engaged orientation and a disengaged orientation;

a pair of fingers attached to the distal perimeter of the cylindrical section at a finger proximal end and extending a second distance to a finger distal end, wherein the fingers are spaced from the shank proximal end by the top section and the cylindrical section of the head; and a pair of tabs respectively attached to the pair of fingers, wherein each tab comprises a tab proximal end attached to a corresponding finger distal end and a tab distal end extending inwardly from the finger distal end to a position closer to the longitudinal axis than the distal perimeter of the cylindrical section, wherein the finger distal end and the tab distal end contact the circular rim of the aerosol can when the cylindrical section is in the engaged orientation, wherein at least one tab distal end of one of the tabs disconnects from the circular rim of the aerosol can when the cylindrical section is in the disengaged orientation, and wherein the first plane bisects the pair of tabs.

12. The adapter of claim 11, wherein the distal perimeter of the cylindrical section comprises a circular arrangement when the pair of side-press webs are in the unactuated position, and wherein the distal perimeter of the cylindrical section comprises an oblong arrangement when the actuator is in the actuated position.

13. The adapter of claim 12, wherein a radial force applied to the grip moves the pair of side-press webs from the unactuated position into the actuated position, and wherein the radial force is applied towards the longitudinal axis.

14. The adapter of claim 11 further comprising a pair of spaces having a space length between the pair of fingers, wherein each of the fingers comprise a finger length between the spaces, wherein the space length is less than the finger length, and wherein the second plane bisects the pair of spaces.

15. The adapter of claim 11, wherein the rib length and rib height are no greater than the first distance, and wherein the shank length is greater than the first distance.

16. The adapter of claim 11, wherein tabs further comprises an angular tip between a pair of intersecting planes, and wherein the head, the actuator, the fingers and the tabs are integrally formed with one another.

17. An adapter for connecting an aerosol can with a circular rim to a tool, comprising:

a shank comprising a shank proximal end and a shank distal end, wherein the shank extends a shank length along a longitudinal axis from the shank proximal end to the shank distal end, and wherein the shank distal end releasably engages the tool;

a head comprising a top section and a cylindrical section, wherein a center portion of the top section is connected to the proximal end of the shank and is aligned with the longitudinal axis of the shank, wherein the cylindrical section extends a first distance away from the shank and comprises a distal perimeter situated around the longitudinal axis;

an actuator connected to the cylindrical section, wherein a first position and a second position of the actuator move at least the distal perimeter of the cylindrical section between an engaged orientation and a disengaged orientation;

a plurality of fingers attached to the distal perimeter of the cylindrical section at a finger proximal end and extending a second distance to a finger distal end, wherein the fingers are spaced from the shank proximal end by the top section and the cylindrical section of the head; and a plurality of tabs attached to the plurality of fingers, wherein each one of the tabs is comprised of a tab proximal end attached to a corresponding finger distal end and a tab distal end extending inwardly from the finger distal end to a position closer to the longitudinal axis than the distal perimeter of the cylindrical section, wherein the finger distal end and the tab distal end contact the circular rim of the aerosol can when the cylindrical section is in the engaged orientation, wherein at least one tab distal end of one of the tabs disconnects from the circular rim of the aerosol can when the cylindrical section is in the disengaged orientation, and wherein the tab distal end is closer to the longitudinal axis in the engaged position than in the disengaged positioned.

18. The adapter of claim 17 further comprising a plurality of spaces having a space length between each of the plurality of fingers, wherein the head further comprises a first plane bisecting a pair of opposing tabs from the plurality of tabs on opposite sides of the longitudinal axis and a second plane bisecting a pair of spaces from the plurality of spaces, wherein the first plane is perpendicular to the second plane, wherein the actuator further comprises a pair of side-press webs, wherein the pair of side-press webs translate within the second plane between an actuated position and an unactuated position and move the pair of opposing tabs between the engaged orientation and the disengaged orientation within the first plane.

19. The adapter of claim 18, wherein the distal perimeter of the cylindrical section comprises a circular arrangement when the pair of side-press webs are in the unactuated position, and wherein the distal perimeter of the cylindrical section comprises an oblong arrangement when the actuator is in the actuated position.

20. The adapter of claim 18, wherein the pair of side-press webs each comprise a rib and a grip, wherein the ribs are situated within the second plane on opposite sides of the longitudinal axis and radially extend a rib length between an inner edge connected to the cylindrical section to an outer edge connected to the grip, and wherein the rib vertically extends a rib height perpendicularly to the longitudinal axis between a top end and a bottom edge respectively proximate to the shank and the distal perimeter.

* * * * *